United States Patent [19]
Gebler et al.

[11] Patent Number: 5,790,199
[45] Date of Patent: Aug. 4, 1998

[54] METHOD AND APPARATUS TO ACCOMMODATE PARTIAL PICTURE INPUT TO AN MPEG-COMPLIANT ENCODER

[75] Inventors: Charlene Ann Gebler, Vestal; Agnes Yee Ngai, Endwell; Michael Patrick Vachon, Johnson City; Robert Leslie Woodard, Newark Valley, all of N.Y.

[73] Assignee: International Business Machines Corporation, Armonk, N.Y.

[21] Appl. No.: 812,822

[22] Filed: Mar. 6, 1997

[51] Int. Cl.$^6$ ................................................ H04N 7/00
[52] U.S. Cl. ................. 348/466; 348/845; 348/384; 371/30
[58] Field of Search .................. 348/845.1, 845, 348/845.2, 448, 449, 466, 441, 443, 464, 458, 459, 96, 97, 102, 103, 104, 110, 111; 371/30, 35

[56] References Cited

U.S. PATENT DOCUMENTS

| | | | |
|---|---|---|---|
| 4,351,062 | 9/1982 | Yoshiya | 375/99 |
| 4,356,507 | 10/1982 | Goldberg et al. | 371/30 |
| 4,647,972 | 3/1987 | Strehl | 348/466 |
| 4,769,703 | 9/1988 | Osborne et al. | 358/139 |
| 4,807,032 | 2/1989 | Strehl | 348/466 |
| 4,901,147 | 2/1990 | Tajima | 358/139 |
| 4,956,709 | 9/1990 | Richer et al. | 348/466 |
| 5,221,967 | 6/1993 | Ward et al. | 358/139 |
| 5,396,497 | 3/1995 | Veltman | 370/100.1 |
| 5,446,492 | 8/1995 | Wolf et al. | 348/192 |
| 5,452,011 | 9/1995 | Martin et al. | 348/459 |
| 5,455,629 | 10/1995 | Sun et al. | 348/466 |
| 5,497,404 | 3/1996 | Grover et al. | 348/466 |

*Primary Examiner*—Tommy P. Chin
*Assistant Examiner*—Gims S. Philippe
*Attorney, Agent, or Firm*—Richard M. Goldman

[57] ABSTRACT

Method and apparatus for detecting and correcting error in an uncompressed digital video image data stream. The method and apparatus identify error or partial picture scenarios. Each of the possible error or partial picture scenarios is identified in a Partial Picture Repair Unit, which causes error processing of the uncompressed video input stream, resulting in the creation of a repaired data stream on the repaired pixel bus. The repair begins upon detection of an erroneous picture, field, or line. Processing for that picture, field or line is stopped upon detection of an error in the synchronization signals, and processing is resumed when the end of line, end of field, or end of picture indicator is detected.

3 Claims, 2 Drawing Sheets

METHOD AND APPARATUS TO ACCOMMODATE PARTIAL PICTURE INPUT TO AN MPEG-COMPLIANT ENCODER

FIELD OF THE INVENTION

This invention relates to digital video encoders and digital video encoding, and more particularly to error correcting. The method and apparatus of the invention detect errors in the synchronization signals of the incoming data stream and stop encoding until the next line, field, or frame, thereby preventing these errors from degrading the video output of the encoder and propagating through the network.

BACKGROUND OF THE INVENTION

For a digital video encoder subsystem, such as an MPEG-2 or HDTV compliant digital video encoder subsystem, the occurrence of an error, such as switching the uncompressed video source from one device or channel to another while encoding, can pose many problems. The input video stream could be disturbed in such a manner as to present the encoder with one or more of the following problem scenarios:

1. Too few pixels per line for the current input line.
2. Too many pixels per line for the current input line.
3. Not enough lines for the current field/frame before the next field/frame arrives.
4. Too many lines for the current field/frame before the next field/frame arrives.
5. Odd-to-Even or Even-to-Odd field parity switch in the middle of a field.
6. Failure to switch field parity between fields.

Typical prior art encoding subsystems may respond to such disturbances by stopping the encoding process, that is, hanging, or by producing continually shifted luminance and/or chrominance output components, or by inverting the even and odd fields, or some other undesirable output. These responses all serve to carry the disturbance through subsequent pictures.

A more desirable response to such an input video disturbance would be to correct the error and resume normal encoding as soon as possible following the input video transition.

Thus, there exists a clear need for a method and apparatus to detect and correct errors in the synchronization signals of the input bitstream to the encoder, that is, the pixel bus, before the errors propagate through the system and become perceptible to the viewer.

SUMMARY OF THE INVENTION

This invention provides a mechanism by which a digital video encoding system or subsystem, for example, an MPEG-2 compliant encoding subsystem or an HDTV compliant encoding subsystem, can respond to an input video error and the ensuing partial picture scenarios, such as an incomplete field transmission where the field parity changes before the end of the field, or identification of a field end where subsequent lines are of the same parity as the previous field, or where an erroneous line end is encountered and the rest of the line is identified as being of the wrong parity, or the like. The method and apparatus of the invention detect such errors and anomalies, and take appropriate action, such as stopping encoding of the particular picture until the next line, parity field, or picture is encountered, and thereafter resuming encoding.

According to our invention, there is provided a Partial Picture Repair Unit ("PPRU") connected to the uncompressed video input port of the encoding subsystem. With the assistance of an "end of picture" detection mechanism, the partial picture repair unit detects each of the partial picture conditions as they are presented at the uncompressed video interface, stops encoding, and either repairs the input video stream or waits for a correct input video stream in such a manner as to make the disturbance transparent to all downstream units in the remainder of the encoding system pipeline. After the occurrence of the partial picture condition, all downstream units will continue to operate properly, although there may be, at most, two frames of transitional video where image degradation may occur.

THE FIGURES

The invention may be understood by reference to the FIGURES appended hereto.

FIG. 1 shows a diagram of elements of a digital video encoding system with a Partial Picture Repair Unit. The elements include a Partial Picture Repair Unit, an End of Picture Detection Unit, an Uncompressed Digital Video DRAM, a DRAM Controller, and the remainder of the encoding subsystem. Uncompressed digital video input and indicia of the end of the datastream components, that is, end of the line, end of the parity field, or end of the picture are inputs to the Partial Picture Repair Unit. The repaired uncompressed digital video goes from the Partial Picture Repair Unit to the DRAM Controller, and from the DRAM Controller to the Uncompressed Digital Video DRAM and the remainder of the encoding subsystem. The remainder of the encoder subsystem provides a compressed video output.

FIG. 2 is a diagram of the Partial Picture Repair Unit. The uncompressed digital video bitstream comes from the pixel bus to the Picture Interface Control Signal Blocking Mechanism, where blocking controls are applied, and the output is on the repaired pixel bus.

DETAILED DESCRIPTION OF THE INVENTION

Figure 1:
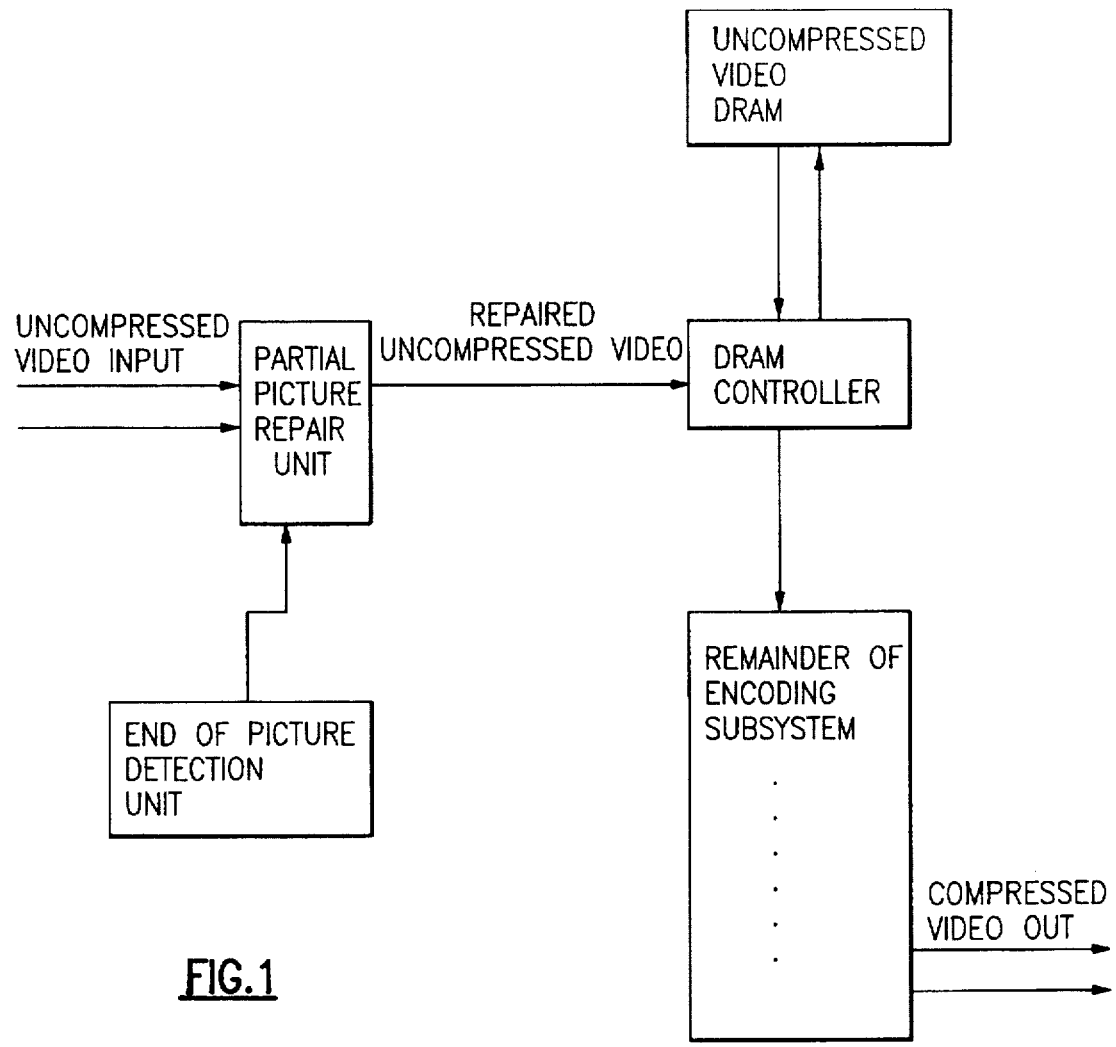
Figure 2:
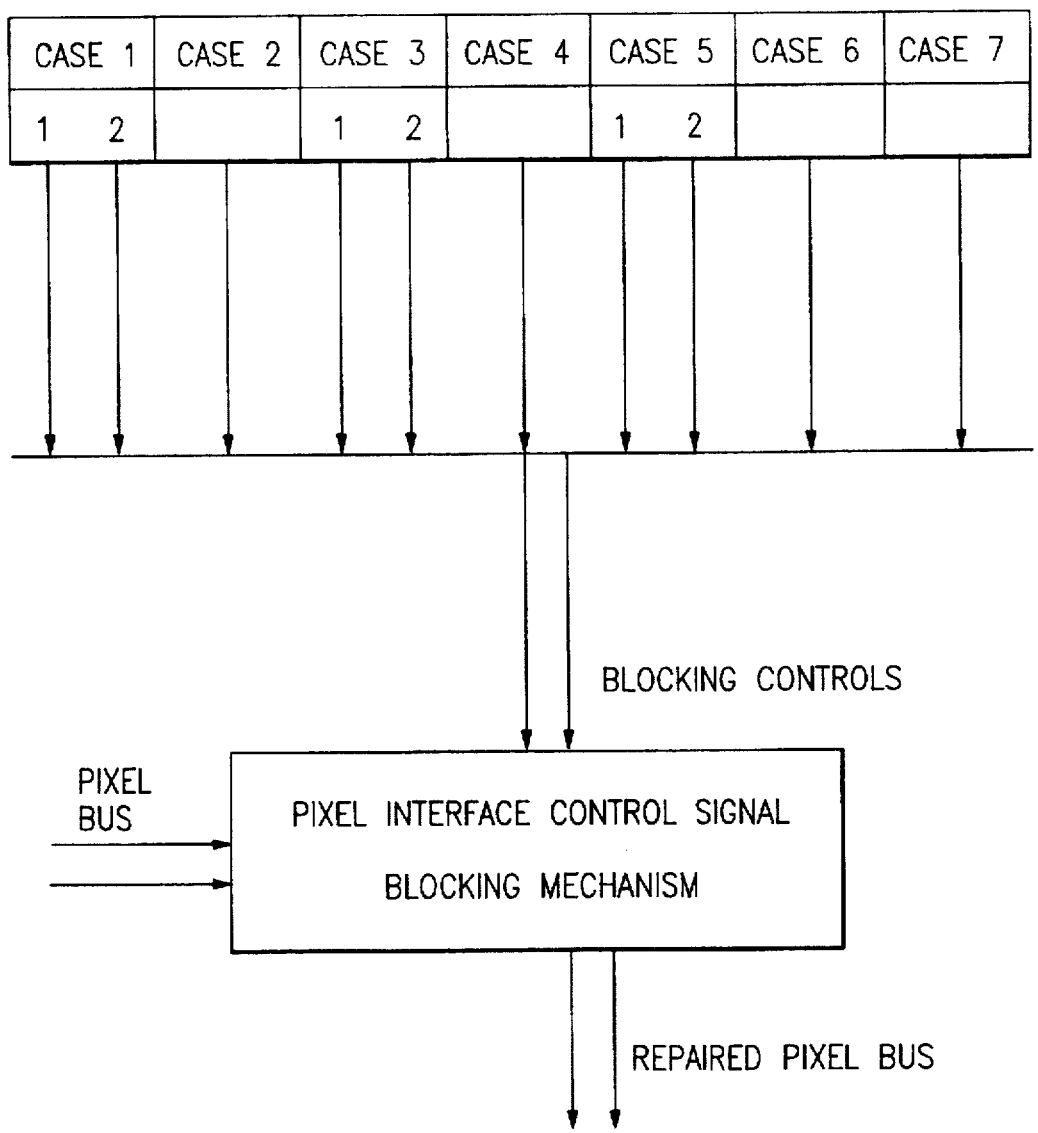

According to our invention there is provided a method and apparatus for detecting and correcting errors in the synchronization signals of an incoming uncompressed digital video datastream before the datastream is compressed as shown in FIGS. 1 and 2. The apparatus encompasses a Partial Picture Repair Unit (PPRU).

FIG. 1 shows a high level diagram of the Partial Picture Repair Unit incorporated in an MPEG2 or HDTV encoding subsystem or similar encoding subsystem. The elements include a Partial Picture Repair Unit, an End of Picture Detection Unit, an Uncompressed Digital Video DRAM, a DRAM Controller, and the remainder of the encoding subsystem. Uncompressed digital video input and indicia of the end of the datastream components, that is, end of the line, end of the parity field, or end of the picture are inputs to the Partial Picture Repair Unit. The repaired uncompressed digital video goes from the Partial Picture Repair Unit to the DRAM Controller, and from the DRAM Controller to the Uncompressed Digital Video DRAM and the remainder of the encoding subsystem. The remainder of the encoder subsystem provides a compressed video output.

FIG. 2 shows a detailed diagram of the Partial Picture Repair Unit (PPRU) architecture. FIG. 2 shows the uncompressed digital video bitstream coming from the pixel bus to the Picture Interface Control Signal Blocking Mechanism, where blocking controls are applied, and the output to the repaired pixel bus.

The PPRU identifies seven different error or partial picture scenarios, denoted by the functional boxes in the diagram showing case 1 through case 7. In addition, each of cases 1, 3, and 5 have two possible variations.

Case 1

The current input picture is a field of first parity and the input switches to another field of the same parity, for example, the current input picture is an odd field, and the input switches to another odd field.

a. variation 1—There are not enough lines to finish the current field, for example the current odd field.
  b. variation 2—There are too many input lines for the current field, for example the current odd field.

Case 2

The current picture is a field of first parity and, before finishing the field the input switches to a field of opposite parity, for example, the current input picture is an odd field, and the input switches to an even field.

Case 3

Case 3 is the opposite of case 1, that is, the current input picture is an even field, and the input switches to another even field.

a. variation 1—There are not enough lines to finish the current even field.
  b. variation 2—There are too many input lines for the current even field.

Case 4

Case 4 is similar to Case 3 except that the current input picture is an even field, and the input switches to an odd field.

Case 5

The current input picture is a frame picture, and the number of lines is improper.

a. variation 1—There are not enough lines to finish the current input picture.
  b. variation 2—There are too many input lines for the current input picture.

Case 6

The current field of a first parity completes, and the next field is of the same parity and the pixel interface parity signal does not switch, for example, the current odd field input picture completes, and then is followed by another odd field. The pixel interface ODD signal does not switch at the beginning of the next field picture.

Case 7

Case 7 is similar to Case 6 except that the current even field input picture completes, and then is followed by another even field. The pixel interface ODD signal does not switch at the beginning of the next field picture.

Each of the possible error or partial picture scenarios results in some form of processing of the uncompressed video input stream by the PPRU, resulting in the creation of a repaired data stream on the repaired pixel bus. The repair begins upon detection of an erroneous field or line. Processing for that field or line is stopped upon detection of an error in the synchronizaton signals, and processing is resumed when the end of line, the end of field, or the end of picture indicator is detected.

The PPRU stops encoding when it detects an error in the synchronization signal, corrects the error, and resumes encoding. The specific actions taken by the PPRU for each of the seven cases can be summarized as detecting an error, stopping encoding to avoid propagating the error, correcting the error or recovering from the error, and resuming encoding.

One type of error, referred to as a Case 1 error above and in FIG. 2, occurs when the current input picture is an odd field, and the input switches to another odd field. In variation 1 there are not enough lines to finish the current odd field. In this case the PPRU detects that there are not enough lines (i.e. pixel bus vertical reference occurs before end of picture is signalled by the end of picture detection unit). The even field data is then blocked, and the next odd field is allowed through until the first odd field is completed (that is, the PPRU receives the end of picture signal). The PPRU then blocks the remaining lines in the odd field. Normal processing resumes when vertical reference is received for the next even field.

In variation 2 of this error there are too many input lines for the current odd field. The PPRU detects too many lines (that is, the PPRU receives the end of picture signal and then additional valid pixel lines before the vertical reference occurs for the next field). The PPRU blocks the remainder of the odd field pixel data. Normal processing resumes when vertical reference is received for the next even field.

In another type of error, referred to as a Case 2 error above and in FIG. 2, the current input picture is an odd field, and the input switches to an even field. In this type of error the PPRU detects field switch (i.e. pixel bus ODD signal switches before the end of picture indication). The PPRU blocks all of the partial even field, blocks the vertical reference for the second odd field, and allows the second odd field pixel data through until the end of picture indication is received. The PPRU then blocks the remainder of the second odd field. Normal processing resumes when vertical reference is received for the next even field.

In still another type of error, referred to as a Case 3 error above and in FIG. 2, the current input picture is an even field, and the input switches to another even field. In variation 1 of this error type there are not enough lines to finish the current even field. The PPRU detects that there are not enough lines (i.e. pixel bus vertical reference occurs before end of picture is signalled by the end of picture detection unit). The odd field data is then blocked, and the next even field is allowed through until the first even field is completed (that is, until the PPRU receives the end of picture signal). The PPRU then blocks the remaining lines in the even field. Normal processing resumes when vertical reference is received for the next odd field.

In variation 2 of this error type there are too many input lines for the current even field. This occurs when the PPRU detects too many lines (that is, the PPRU receives the end of picture signal and then additional valid pixel lines before the vertical reference occurs for the next odd field). The PPRU blocks the remainder of the even field pixel data. Normal processing resumes when vertical reference is received for the next odd field.

In still another type of error, referred to as a Case 4 error above and in FIG. 2, the current input picture is an even field, and the input switches to an odd field. In this case the PPRU detects field switch (i.e. pixel bus ODD signal switches before the end of picture indication). The PPRU blocks all of the partial odd field, blocks the vertical reference for the second even field, and allows the second even field pixel data through until the end of picture indication is received. The PPRU then blocks the remainder of the second even field. Normal processing resumes when vertical reference is received for the next odd field.

In still another type of error, referred to as a Case 5 error above and in FIG. 2, the current input picture is a frame picture. In variation 1 there are not enough lines to finish the current input picture. The PPRU detects not enough lines (vertical reference for the next frame arrives before the end of picture signal). The PPRU blocks the generation of the new picture indication to the remainder of the encoding subsystem, and then allows the next frame's pixel data through until the end of picture signal is received. The PPRU then blocks the remainder of the pixel data for that frame. Normal processing resumes when the vertical reference arrives for the next frame.

In variation 2 of this error condition there are too many input lines for the current input picture. The PPRU detects too many lines (that is, the end of picture signal is received and then additional valid pixel lines arrive before vertical reference for the next frame picture). The PPRU blocks the excess pixel lines for the current frame. Normal processing resumes when the vertical reference arrives for the next frame.

In yet another error condition, referred to as a Case 6 error above and in FIG. 2, the current odd field input picture completes, and then is followed by another odd field. The pixel interface ODD signal does not switch at the beginning of the next field picture. The PPRU detects that the field did not switch, and blocks the entire odd field. Normal processing resumes when the vertical reference for the next even field is received.

In still another error condition, referred to as a Case 7 error above and in FIG. 2, the current even field input picture completes, and then is followed by another even field. The pixel interface ODD signal does not switch at the beginning of the next field picture. The PPRU detects that the field did not switch, and blocks the entire even field. Normal processing resumes when the vertical reference for the next odd field is received.

While the invention has been described with respect to certain preferred embodiments and exemplifications, it is not intended to limit the scope of the invention thereby, but solely by the claims appended hereto.

We claim:

1. In a method of compressing an uncompressed digital video image where the image is a field of a first parity, and the input changes to another field of the first parity so that there are not enough lines to finish the current field of the first parity and pixel bus vertical reference occurs before the end of picture is signalled by an end of picture detection unit, the improvement comprising detecting that there are not enough lines of field data of the first field of the first parity, blocking the next field of second parity, then allowing the next field of first parity through until the first field of first parity is completed and the end of picture signal is received, blocking the remaining lines in the next field of first parity, and resuming normal processing when a vertical reference is received for said next field of second parity.

2. In the method of compressing an uncompressed digital video image of claim 1 where the image is an odd field, and the input changes to another odd field so that there are not enough lines to finish the current odd field and a pixel bus vertical reference occurs before the end of picture is signalled by the end of picture detection unit, the improvement comprising detecting that there are not enough lines of odd field data, blocking said next even field, then allowing the next odd field through until the first odd field is completed and the end of picture signal is received, blocking the remaining lines in the next odd field, and resuming normal processing when a vertical reference is received for said next even field.

3. In the method of compressing an uncompressed digital video image of claim 1 where the current input picture is an even field, and the input switches to another even field and there are not enough lines to finish the current even field the improvement comprising detecting by a pixel bus vertical reference occurring before an end of picture is signalled by an end of picture detection unit that there are not enough lines blocking the odd data field and allowing the next even field through until the first even field is completed and the end of picture signal is received, blocking the remaining lines in the even field, and resuming normal processing when a vertical reference is received for said next odd field.

\* \* \* \* \*